April 14, 1964  H. C. SWIFT  3,128,848
AUTOMATIC BRAKE ADJUSTING MECHANISM
Filed Sept. 24, 1962  2 Sheets-Sheet 1

INVENTOR.
Harvey C. Swift.
BY
Harness, Dickey & Pierce
ATTORNEYS

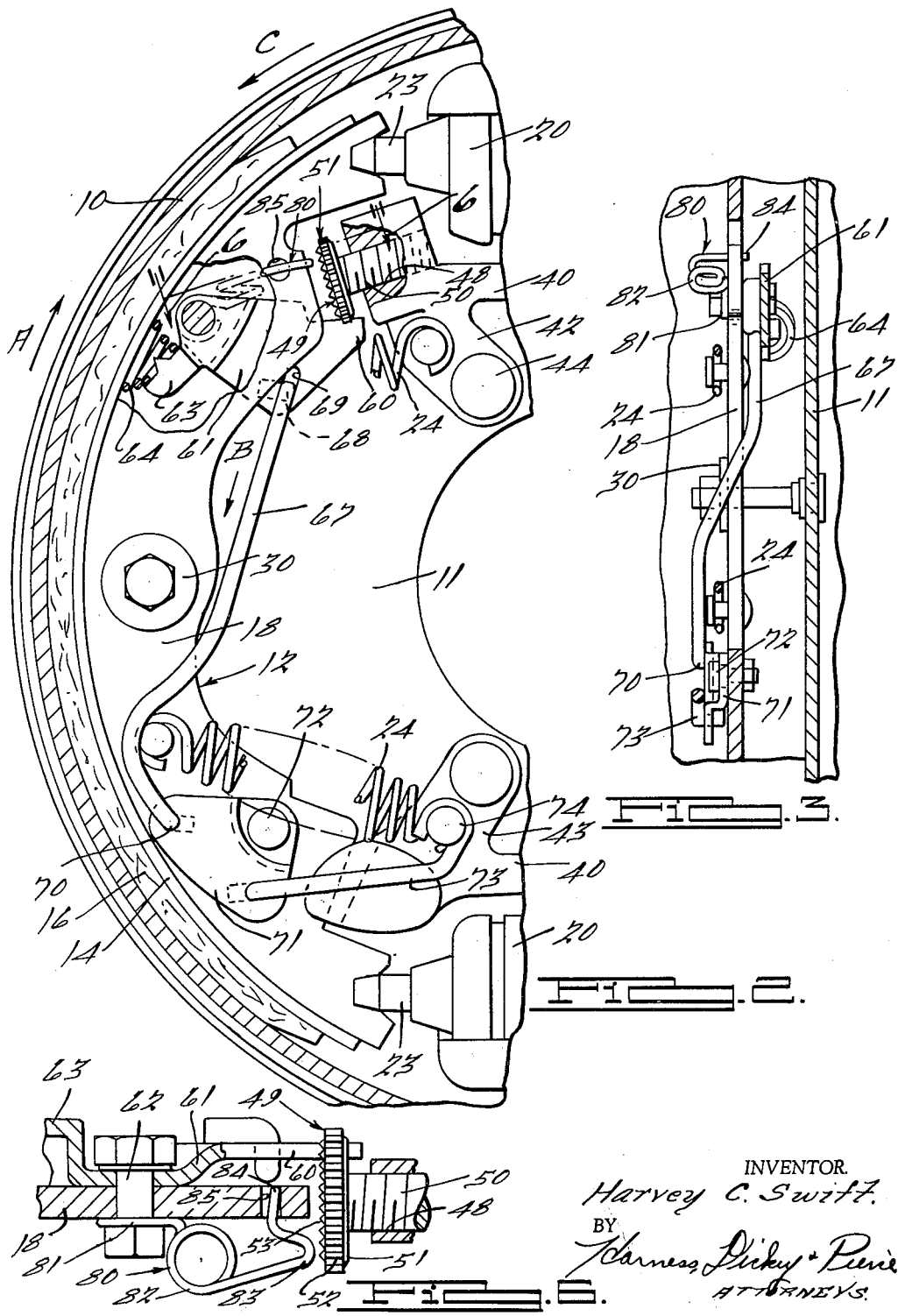

United States Patent Office 3,128,848
Patented Apr. 14, 1964

3,128,848
AUTOMATIC BRAKE ADJUSTING MECHANISM
Harvey C. Swift, Birmingham, Mich., assignor to Kelsey-Hayes Company, Romulus, Mich., a corporation of Delaware
Filed Sept. 24, 1962, Ser. No. 225,673
8 Claims. (Cl. 188—79.5)

This invention relates to brakes of the type comprising an annular brake drum and arcuate brake shoes and, more particularly, to means for automatically adjusting the brakes when the wear on the brake shoes requires such adjustment.

One of the objects of this invention is to provide automatic adjusting means controlled by excessive movement of the shoe being adjusted due to wear on the brake lining thereof.

Another object of this invention is to provide an automatic adjuster for the brake shoes adapted to prevent overadjustment of the brake shoes under all conditions.

A further object of the invention is to provide automatic adjusting means of this type which is rendered operative only when the vehicle is moving in reverse and which does not affect the normal operation of the brake when applied during the forward movement of the vehicle.

Another object of the invention is to provide a device of this type wherein its structural simplicity produces a substantial economy in its manufacturing, installation and maintenance costs.

The various objects and advantages, and the novel details of construction of one commercially practical embodiment of the invention will become more apparent as this description proceeds, especially when considered in connection with the accompanying drawings, in which:

FIGURE 2 is a slightly enlarged fragmentary view, similar to FIGURE 1, with the brake shoes applied and the brake drum rotating in the reverse direction;

FIGURE 5 is a detail sectional view taken substantially on the plane indicated by line 5—5 in FIGURE 1; and FIGURE 6 is a similar view taken substantially on the plane indicated by line 6—6 in FIGURE 2.

Figure 1:
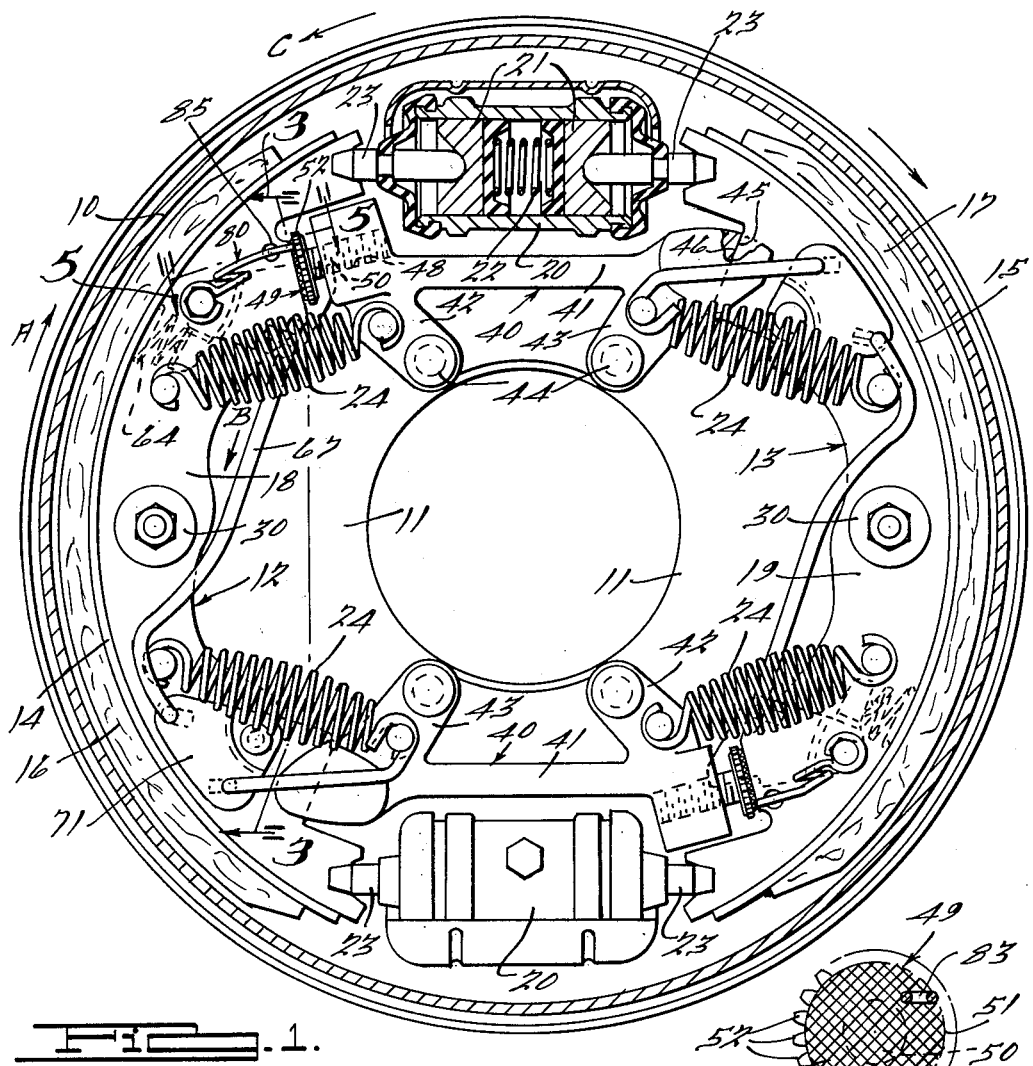
FIGURE 1 is a sectional elevational view of a brake incorporating the features of this invention, the brake shoes being shown in released position.
Figures 3, 4:
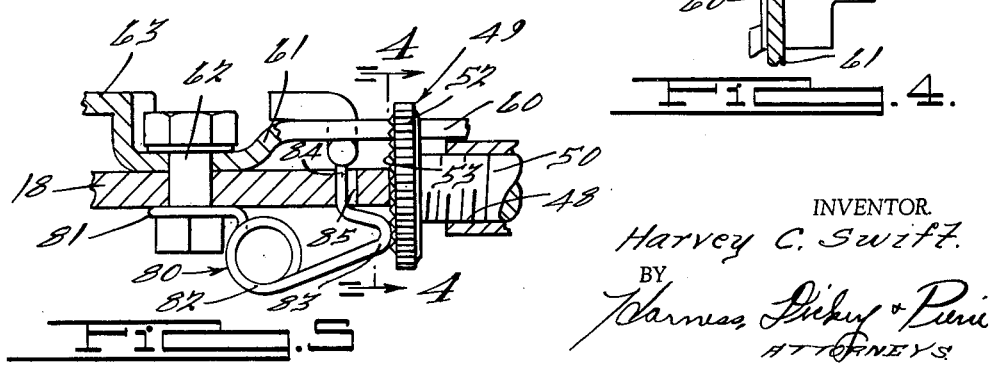
FIGURE 3 is a fragmentary sectional, elevational view taken substantially on the plane indicated by line 3—3 in FIGURE 1.
FIGURE 4 is a detail sectional view taken substantially on the plane indicated by line 4—4 in FIGURE 5.

The illustrative embodiment of the invention is shown in the drawings as applied to a brake structure of the internal expanding type comprising arcuate brake shoes adapted to cooperate with the inner surface of a brake drum. The environment in which the invention is illustrated is shown in FIGURES 1 and 2, in which the reference character 10 indicates a brake drum which is mounted on a wheel hub (not shown) for rotation therewith. A stationary backing plate 11 is mounted on a stationary part of the vehicle (not shown).

In addition to the elements already described, the basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 16 and 17.

A hydraulic wheel or brake cylinder 20 is interposed between each pair of adjacent ends of the brake shoes 12 and 13. These wheel cylinders are of conventional construction, each comprising a pair of pistons 21 urged apart by a light spring 22. The pistons 21 operate plungers 23, extending from opposite ends of the cylinder for engagement with the webs 18 and 19 and providing the actuating means for moving the brake shoes 12 and 13 into engagement with the brake drum 10. Hydraulic fluid is delivered to the brake cylinders 20 between the pistons 21 from a conventional brake pedal operated master cylinder (not shown). Retraction springs 24 normally retain the ends of the brake shoes in engagement with the plungers 23 and with the stationary and adjustable anchors yet to be described.

Each brake shoe is guided and held in proper relation to the backing plate 11 by means of a conventional hold-down device 30.

The structure thus far described is substantially conventional and the features which form the subject matter of the present invention will now be described in detail. This invention relates to means for automatically adjusting the brake shoes when adjustment is necessary due to wear on the brake linings thereof and to provide means for preventing overadjustment of the brake shoes under all conditions.

The structure about to be described is duplicated at both ends of the brake shoes so that automatic adjustment of both shoes of the brake assembly is provided for.

For the purposes of this description, reference will be made to the automatic adjusting means shown at the upper portion of the brake assembly illustrated in FIGURE 1 and in FIGURE 2.

Secured to the backing plate 11 is a torque-taking or torque-resisting member 40 which consists essentially of a transverse strut 41 connecting spaced arms 42 and 43. The torque-resisting member is secured to the backing plate by means of rivets, bolts, or the like 44 so as to be rigid therewith. The arm 43 is provided with a slot or recess 45 acting as a fixed anchor to receive the end of the brake shoe web as indicated at 46 in FIGURE 1. The other arm 42 of the torque-resisting member 40 is provided with a threaded opening 48 adapted to receive an adjustable anchor 49. The adjustable anchor consists of an adjusting screw or threaded shank 50 threadedly received in the threaded opening 48 and a flat head 51 in the form of a toothed gear or star wheel having peripheral teeth 52 and a flat top surface 53 which is knurled or otherwise roughened. The head 51 of the adjustable anchor 49 is adapted to engage the adjacent portion of the web 18 of the adjacent brake shoe 12 so that when the adjustable anchor is actuated in one direction to move the threaded shank 50 out of the threaded recess 48, the brake shoe 12 will be adjusted towards the brake drum to take up any wear in the lining 16 thereof.

The teeth 52 of the toothed or star wheel are adapted to be engaged by the pawl portion 60 of an adjusting lever 61 pivotally mounted by a pivot pin or bolt 62 to the web of the adjacent brake shoe. The adjusting lever 61 is substantially in the form of a bellcrank, being provided with a short laterally extending arm 63. The pawl 60 is biased in the direction in which it will engage the teeth 52 of the adjustable anchor by means of a spring 64 interposed between the arm 63 and the adjacent portion of the rim of the brake shoe. When the spring 64 functions to swing the lever 61 about its pivot 62, the pawl 60 thereof will engage a tooth and rotate the threaded shank 50 in a direction to move the brake shoe toward the brake drum.

The adjusting lever 61 is operatively connected to its brake shoe by means of a link 67 provided with a hooked end 68 which slidably engages in a slot 69 formed in the adjusting lever 61. The other end of the link 67 is pivotally connected as at 70 to a plate-like bellcrank lever 71 pivotally connected as at 72 to the web of the brake shoe. This bellcrank lever 71 is connected by means of a link 73 to a fixed anchor 74 formed on the arm 43 of the other torque-resisting member 40. Thus, when the brake shoe (brake shoe 12 in FIGURES 1 and 2) moves in the direction of arrow A, which it does when the vehicle is moving in a reverse direction, motion will be transmitted from the brake shoe through the link 67 to the adjusting lever 61 to rock the same about its pivot 62 to actuate the pawl portion 60 to cock or move the same to an operative position against the action of spring 64 whereupon in its subsequent movement, influenced by the spring 64, it will engage one of the teeth 52 and rotate the screw 50 to adjust the adjustable anchor.

It will be understood that when the brake shoe (12 in FIGURES 1 and 2) moves in the direction of arrow A, which it does when the brakes are applied and the vehicle is moving in a reverse direction, the bellcrank lever 71 will be rotated in a counterclockwise direction by link 73, and the link 67 will be moved in the direction of arrow B. Thus, the pawl 60 will be positioned behind one of the teeth 52 on the toothed or star wheel of the adjustable anchor 49, so that when the adjustable anchor is unlocked, the adjusting lever 61 can rotate the adjustable anchor one tooth space to adjust the brake shoe. As will be later described, this occurs when the brake lining has become worn and, as a consequence, the brake shoe partakes of excessive movement during application of the brakes when the vehicle is moving in a forward direction.

The slot 69 in the adjusting lever 61 permits relative movement between the adjusting lever 61 and the link 67 during the normal application of the brakes.

It is an important feature of this invention to provide an automatic adjusting means, as previously described, having means for preventing overadjustment of the brake under all conditions. This invention provides means for permitting adjustment of the brake shoe only when there is excessive movement of the brake shoe due to wear on the lining thereof.

This latter means comprises a locking device 80 in the form of a spring member or device having an end portion 81 secured to the web of the brake shoe, as, for instance, by engagement with the pivot pin or bolt 62. The spring device consists of an intermediate coil portion 82, a nose-like extension forming a spring detent 83, and an end portion 84. The extension 83 is biased into engagement with the knurled portion 53 of the adjustable anchor by the coil portion 82 so as to normally lock the adjustable anchor against rotation. The end 84 of the locking device extends loosely through an aperture 85 formed in the web of the brake shoe. Normally, the end portion 84 is in the left-hand side of the aperture 85, as viewed in FIGURE 5, and the extension 83 is in locking engagement with the knurled portion 53 of the adjustable anchor. When, however, the brake shoe partakes of excessive movement, due to wear on the brake lining thereof, the end portion 84 of the locking device will be engaged by the opposite side of the aperture 85 to flex the spring device and move it away from the knurled portion 53 of the adjustable anchor. This is the position of the parts shown in FIGURE 6. When the locking device is in the position shown in FIGURE 6, the adjustable anchor is free to be rotated by the pawl portion 60 of the adjusting lever 61 which, as stated heretofore, is biased in one direction by the spring 64. Thus, the rotatable anchor will be rotated one tooth space and will move the brake shoe toward the brake drum to take up the wear in the lining. Obviously, the aperture 85 permits movement of the brake shoe during the normal operation of the brakes, and it is only upon excessive movement of the brake shoe, due to wear on the brake lining that the locking device 80 is moved from the position shown in FIGURE 5 to the position shown in FIGURE 6.

From the foregoing, it will be seen that during normal operation of the brakes, the locking device 80 prevents adjustment of the adjustable anchor, and it is only when the brake shoe partakes of excessive movement, due to wear on its lining, that the locking device will be released to permit adjustment of the anchor.

As previously mentioned, the structure just described in detail is duplicated at the diametrically opposite side of the brake, as shown at the bottom of FIGURE 1, in which instance the operation of the adjusting lever 61 and the locking device 80 are controlled by the other brake shoe 13.

The vehicle, during its forward movement, rotates the brake drum in the direction of arrow C and also moves the brake shoe in this direction. The arrow A indicates the direction of movement of the brake drum and the brake shoe when the vehicle is moving in a reverse direction. The adjusting lever is moved to operative position only when the brakes are applied and the vehicle is moving in a reverse direction, and the locking device is released and the adjustment made only when the vehicle is moving in a forward direction.

While a commercially practical embodiment of the invention has been described and illustrated herein somewhat in detail, it will be understood that various changes may be made as may come within the purview of the accompanying claims.

What is claimed is:

1. In a vehicle brake comprising a brake shoe, a brake drum, a torque-resisting member, and means for moving said brake shoe into engagement with said brake drum, that improvement which comprises, an adjustable anchor carried by said torque-resisting member and adapted for engagement by said brake shoe, spring detent means normally locking said anchor to prevent adjustment thereof, an adjusting member for adjusting said anchor, means activated by movement of said brake shoe in one direction for moving said adjusting member to an operative position with respect to said anchor, and a lost motion connection between said spring detent and brake shoe actuated by excessive movement of said brake shoe in the other direction for releasing said spring detent means to permit adjustment of said anchor.

2. A brake comprising a brake shoe having a brake lining, a roatable brake drum, a backing plate, a torque-resisting member, means for moving said brake shoes into engagement with said brake drum, an adjustable anchor carried by said torque-resisting member adapted for engagement by said brake shoe, an adjusting lever pivotally mounted on said backing plate and functioning as a pawl for adjusting said anchor, means connecting said adjusting lever to said brake shoe whereby movement of said brake shoe in one direction will move said adjusting lever to cocked position with respect to said anchor, spring detent means normally locking said anchor to prevent adjustment thereof, and a lost motion connection between said spring detent and brake shoe actuated by movement of said brake shoe in the other direction for releasing said spring detent means to permit said adjusting lever to adjust said anchor.

3. A brake comprising a brake shoe having a brake lining, a rotatable brake drum, a backing plate, a torque-resisting member, means for moving said brake shoes into engagement with said brake drum, an adjustable anchor carried by said torque-resisting member adapted for engagement by said brake shoe, an adjusting lever pivotally mounted on said backing plate and functioning as a pawl for adjusting said anchor, means connecting said adjusting lever to said brake shoe whereby movement of said brake shoe in one direction will move said adjusting lever to cocked position with respect to said anchor, spring detent means mounted on said brake shoe normally locking said anchor to prevent adjustment thereof, and a lost motion connection between said spring detent and brake shoe actuated by excessive movement of said brake shoe in the other direction due to wear on the brake lining for releasing said spring detent locking means to permit said adjusting lever to adjust said anchor.

4. A brake comprising a brake shoe having a brake lining, a rotatable brake drum, a backing plate, a torque-resisting member, means for moving said brake shoes into engagement with said brake drum, an adjustable anchor carried by said torque-resisting member adapted for engagement by said brake shoe, an adjusting lever pivotally mounted on said backing plate and functioning as a pawl for adjusting said anchor, means connecting said adjusting lever to said brake shoe whereby movement of said brake shoe upon application of the brakes while the vehicle is moving in a reverse direction will move said adjusting lever to an operative position with respect to said anchor, spring detent means mounted on said brake shoe normally locking said anchor to prevent adjustment thereof, and a lost motion connection between said spring detent and brake shoe actuated by excessive movement of said brake shoe, due to wear on the brake lining, upon application of the brakes while the vehicle is moving in a forward direction, for releasing said spring detent to permit said adjusting lever to adjust said anchor.

5. A device as described in claim 3 in which the adjustable anchor is a threaded member having a head provided with peripheral teeth and a flat roughened surface, and said locking means is a spring member engaging the flat roughened surface of said head.

6. A device as described in claim 3 in which the adjustable anchor is an adjusting screw having a head provided with peripheral teeth adapted to be engaged by the adjusting lever pawl, and provided with a top surface which is knurled, and said locking means is a spring member mounted on said brake shoe and provided with an extension resiliently urged into engagement with said knurled top surface.

7. A device as described in claim 3 in which the adjustable anchor is an adjusting screw having a head provided with peripheral teeth adapted to be engaged by the adjusting lever pawl, and provided with a roughened top surface, and said locking means comprises a spring member having one end secured to said brake shoe, an intermediate coiled portion, and an extension biased into engagement with said roughened top surface, and said lost motion connection comprising an end portion on said spring member engaging an aperture in said brake shoe for moving said locking means to inoperative position upon excessive movement of said brake shoe.

8. A brake comprising a brake shoe having a brake lining, a rotatable brake drum, a backing plate, a torque-resisting member, means for moving said brake shoe into engagement with said brake drum, an adjusting lever functioning as a pawl pivotally mounted on said backing plate, an adjustable anchor carried by said torque-resisting member adapted for engagement by said brake shoe and comprising a threaded member having a head provided with peripheral teeth adapted to be engaged by the adjusting lever pawl, said head having a roughened surface, means connecting said adjusting lever to said brake shoe whereby movement of said brake shoe in one direction will move said adjusting lever to operative position with respect to the toothed head of said anchor, a spring member secured to said brake shoe and having an extension biased into engagement with the roughened surface of said head to prevent adjustment of said anchor, and an end portion on said spring member engaging an aperture in said brake shoe for moving said spring member out of engagement with said anchor upon movement of said brake shoe a predetermined distance in the other direction due to excessive wear on the lining thereof.

References Cited in the file of this patent

UNITED STATES PATENTS

| | | |
|---|---|---|
| 1,824,052 | La Brie | Sept. 22, 1931 |
| 2,389,618 | Goepfrich | Nov. 27, 1945 |
| 3,074,514 | Mossey et al. | Jan. 22, 1963 |